United States Patent
Carmel et al.

(10) Patent No.: US 8,180,785 B2
(45) Date of Patent: May 15, 2012

(54) METHOD AND SYSTEM FOR SEARCHING NUMERICAL TERMS

(75) Inventors: David Carmel, Haifa (IL); Doron Cohen, Haifa (IL); Benjamin Sznajder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/494,345

(22) Filed: Jun. 30, 2009

(65) Prior Publication Data

US 2010/0332502 A1 Dec. 30, 2010

(51) Int. Cl.
*G06F 17/30* (2006.01)
*G06F 15/16* (2006.01)

(52) U.S. Cl. ........................ 707/759; 707/765

(58) Field of Classification Search ................... 707/759, 707/765
See application file for complete search history.

(56) References Cited

U.S. PATENT DOCUMENTS

| | | | |
|---|---|---|---|
| 5,915,251 A | 6/1999 | Burrows et al. | |
| 6,289,354 B1 | 9/2001 | Aggarwal et al. | |
| 6,446,068 B1 | 9/2002 | Kortge | |
| 7,251,648 B2 | 7/2007 | Chaudhouri et al. | |
| 7,415,461 B1 | 8/2008 | Guha et al. | |
| 7,461,064 B2 | 12/2008 | Fontoura et al. | |
| 2005/0262062 A1* | 11/2005 | Xia | 707/3 |
| 2008/0140604 A1 | 6/2008 | Collier et al. | |

OTHER PUBLICATIONS

P. Ciaccia, M. Patella, and P. Zezula. M-tree: An efficient access method for similarity search in metric spaces. In VLDB, Aug. 1997.
V. Dohnal, C. Gennaro, P. Savino, and P. Zezula. D-index: Distance searching index for metric data sets. Multimedia Tools Appl., 21(1), 2003.
Rakesh Agrawal and Ramakrishnan Srikant. Searching with numbers. WWW '02: Proceedings of the 11th international conference on World Wide Web.
Marcus Fontoura, Ronny Lempel, Runping Qi, and Jason Zien. Inverted index support for numeric search. Internet Mathematics, 3(2):153-185, May 2007.

* cited by examiner

*Primary Examiner* — John E Breene
*Assistant Examiner* — Alex Gofman

(57) ABSTRACT

A method and system for searching numerical terms are provided. The method includes processing a numerical term to a stem, the stem being in the form of a number, and a distance measurement of the numerical term to the stem, wherein a numerical term is a string of characters identified as a number by a numeric parser, and indexing the numerical term in a search index by the stem for search retrieval. The method includes receiving a query and processing the query to divide it into terms, including a numerical term. The numerical terms of the query are also processed to a stem and a distance measurement and document results are retrieved for the stem from an index.

20 Claims, 5 Drawing Sheets

METHOD AND SYSTEM FOR SEARCHING NUMERICAL TERMS

FIELD OF THE INVENTION

This invention relates to the field of information retrieval. In particular, the invention relates to searching numerical terms.

BACKGROUND OF THE INVENTION

A large amount of the useful web comprises documents that consist largely of numeric values embedded in the text. Searching for documents containing specific numeric values has only limited support. Most existing Web search engines treat numbers as strings, ignoring their numeric value. Thus, they only support exact matches for numeric terms. For example, while searching for "32.5", such systems will retrieve only documents containing the exact string "32.5", ignoring documents containing the same value in a different representation (e.g. 32.50, 32.500, 3.25e+1), or close values to the query term (e.g. 32.49, 32.51).

Treating numbers as strings has many advantages since numbers and keywords can be represented the same and measuring textual similarity between textual records is a well known problem and has many solutions. However, such methods do not provide support for numerical search.

Search for numeric values calls for a specific solution. For such queries, the user is interested in documents containing values that match exactly the numbers given as query, but may also be interested in values that are close to the numeric query in such a way that documents with closer values are ranked higher.

Some search system support "range search" (see for example Google Numeric range search, Google is a trade mark of Google, Inc.) that allows retrieval of documents containing numeric values in a specific range. Thus, searching for the range [32 . . . 33] will retrieve documents containing numeric values that are "close" to 32.5. However, there is no search solution that ranks the matching documents according to their distance from the query numerical values.

Another approach is based on "K nearest neighbor (K-NN) search" which is able to find the closest K numeric values to the query numbers. Another similar approach looks for "perfect merge" solution between the query values to the document values. These solutions are focused on matching numbers, ignoring textual similarity. Hence, hybrid queries containing both text and numbers require a special treatment.

SUMMARY OF THE INVENTION

According to a first aspect of the present invention there is provided method for searching numerical terms, comprising: processing in a computer-based application a numerical term to a stem, the stem being in the form of a number, and a distance measurement of the numerical term to the stem, wherein a numerical term is a string of characters identified as a number by a numeric parser; indexing the numerical term in a search index by the stem for search retrieval; wherein any of said steps are implemented in either of computer hardware or computer software and embodied in a computer-readable medium.

According to a second aspect of the present invention there is provided a computer program product for searching numerical terms, the computer program product comprising: a computer readable medium; computer program instructions operative to: process a numerical term to a stem, the stem being in the form of a number, and a distance measurement of the numerical term to the stem, wherein a numerical term is a string of characters identified as a number by a numeric parser; index the numerical term in a search index by the stem for search retrieval; wherein said program instructions are stored on said computer readable medium.

According to a third aspect of the present invention there is provided a method of providing a service to a customer over a network, the service comprising: processing in a computer-based application a numerical term to a stem, the stem being in the form of a number, and a distance measurement of the numerical term to the stem, wherein a numerical term is a string of characters identified as a number by a numeric parser; indexing the numerical term in a search index by the stem for search retrieval; wherein any of said steps are implemented in either of computer hardware or computer software and embodied in a computer-readable medium.

According to a fourth aspect of the present invention there is provided a system for searching numerical terms, comprising: a processor; a computer-based stemming module for processing a numerical term to a stem, the stem being in the form of a number, and a distance measurement of the numerical term to the stem, wherein a numerical term is a string of characters including identified as a number by a numeric parser; an indexer for indexing the numerical term in a search index by the stem for search retrieval; wherein any of the stemming module and the indexer are implemented in either of computer hardware or computer software and embodied in a computer readable medium.

An aim of the described method and system is to develop an efficient unified approach that treats numbers embedded in the text in a similar way to textual terms. With this approach, documents can be efficiently retrieved that contain both textual terms and numerical terms fitting the query, and ranked according to their similarity to the query. The described similarity measure will consider both textual similarity and numerical similarity between the documents and the query. The solution is based on inverted index techniques, and provides an efficient implementation to a unified similarity measurement between records containing both text and numbers.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are described for searching for text and numbers in a unified approach. The described method and system use the notion of "stemming" applied to the context of numbers. Several numbers belonging to the same interval are indexed by the same token in the lexicon. Each number is indexed by the pair of its stem and its distance from this stem. For example, given the value "32.5" and its stem 30, then 32.5 will be indexed by (30, 2.5).

During a retrieval stage, queried terms and numbers are stemmed the same. This solution is efficient, in that, it is similar to regular (non-numeric) text search in inverted indexes, and that it is sufficient to consider only documents indexed by the textual and numeric stems of the query terms. With simple arithmetic computations, the matching documents can be ranked according to their similarity to the query while this similarity measure considers both textual similarity and numerical similarity.

Figure 1:
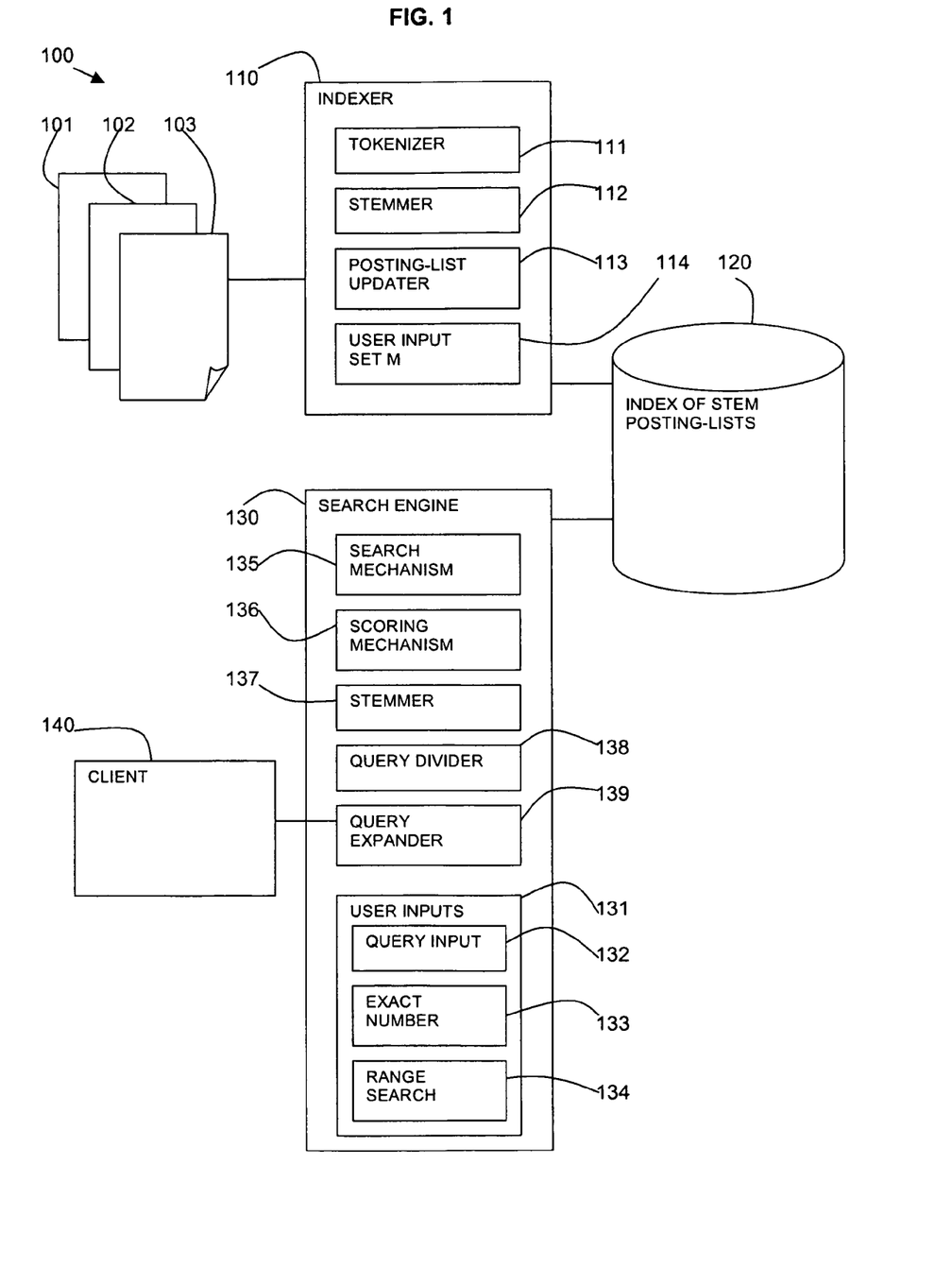
FIG. 1 is a block diagram of a system in accordance with the present invention.

Referring to FIG. 1, a block diagram shows a system 100 for indexing and searching documents. The system 100 includes documents 101-103 to be indexed and searched. The documents include textural terms and numeric terms.

The system 100 includes an indexer 110, which may be provided in the form of a server. The indexer 110 indexes documents 101-103 according to the textual and numeric stemming method described further below.

The indexer 110 includes a tokenizer 111 for tokenizing the content (textual and numeric) of the documents 101-103. The tokenizer 111 may include a numeric parser for identifying terms as numbers. The indexer 110 also includes a stemmer 112 including a numeric stemmer and a textual stemmer for converting the tokens into stem format as described further below. The indexer 110 also includes a posting-list updater 113 for updating an index of posting-lists 120 for the stems of the tokenised content as described further below. The indexer 110 also includes a user input 114 for setting parameters for the indexing including the modulus of the stemming as described further below.

The system 100 also includes a search engine 130 accessible by a client 140 for searching documents 101-103. The search engine 130 may include the indexer 110 or may be a separate component. As well known in the field, the components 101-103, 110, 120, 130, 140 of the system 100 may communicate via a network, such as the Internet or an intranet.

The search engine 130 includes a user input 131 including a mechanism for inputting a user query 132, which may be formed of text and/or numbers. The search engine 130 includes a query processor including a divider 138 for dividing a query 132 into query terms and a stemmer 137 for converting a query term into stem format for searching. A query term may be interpreted as a number by a number parser and the stemmer 137 may include a numeric stemmer and a textual stemmer. The search engine 130 may optionally including a query expander 139 for processing a numerical term to more than one stem.

The user input 131 may also include a mechanism for specifying search requirements, such as an exact number search 133 in which case a filter filters our terms with a different distance measurement from the query term, or a range search 134 in which case a filter filters out terms whose distance measurement exceeds a given range.

The search engine 130 includes a search mechanism 135 or retriever for searching an index 120 and a scoring mechanism 136 for scoring returned results.

Figure 2:
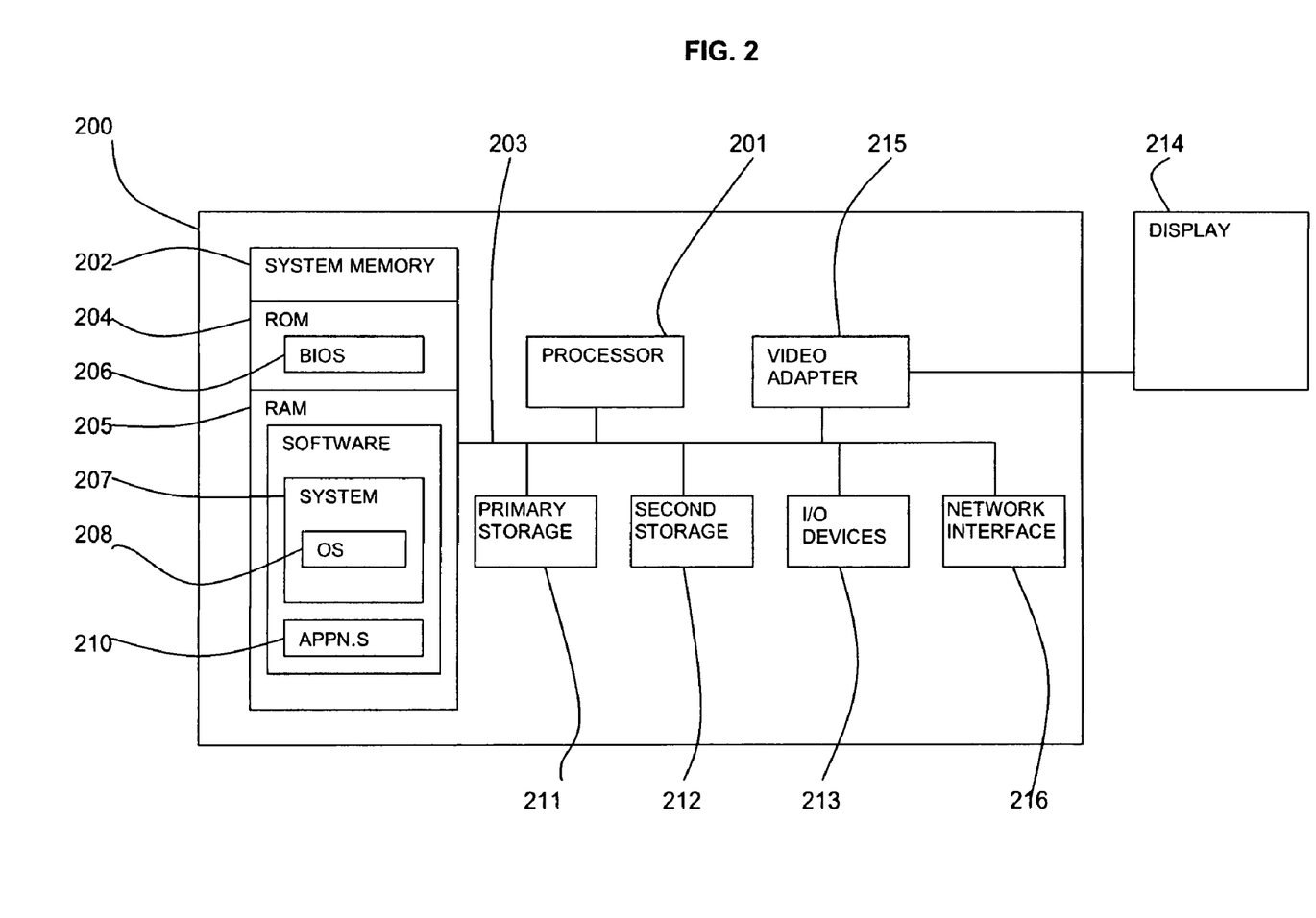
FIG. 2 is a block diagram of a computer system in which the present invention may be implemented.

Referring to FIG. 2, an exemplary system for implementing the indexer and the search engine includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Indexing

The text of documents and queries are represented by their contained words, for example in the Bag of Words (BOW) scheme. In that scheme, the text is represented by a set of unique tokens extracted from the text. Other possible schemes also maintain information about the words' positions and order. The described method covers all schemes made of documents words. Textual terms might be stemmed by any existing stemmer, or alternatively, by any existing morphological analyzer.

Numerical terms are keywords that are interpreted as numbers by a standard numeric parser. For example, by the Java NumericFormat object (Java is a trade mark of Sun Microsystems, Inc.).

Numerical terms are stemmed as follows:
Define a positive integer M to be the modulus for the numerical stemming process (M can be set according to several criteria discussed below). M can be any positive number and not only an integer; however, in this example, M is positive integer.

Define stem(x) as the closest integer multiple of M that is less or equal to x.
Formally, stem(x)=floor(x)−(floor(x)mod M).
However is M is not an integer, a more general definition would be:
stem(x)="a multiplication of M which is not greater than x and which is closer to x than any other multiplication of M"
Define d(x) as the distance of x from its stem.
Formally d(x)=x−stem(x)
The distance d(x) is kept as a specific attribute of the term's stem. This is marked by stem(x).d. For example, given M=3, then the stem of 32.5, stem(32.5)=30 and its distance attribute, stem(32.5).d=2.5.

Indexing a document first involves the document content being tokenized, extracting all tokens.

Tokenization is extended to numerical strings of characters. Recognizing a string as a numerical term can be done by any pattern matching algorithm, and the way it is done is independent for the core of the disclosure.

Each token is then stemmed as described above. Then, for each token t, add document doc to the posting-list of stem(t) with the corresponding offset of t. An offset within a data structure is an integer indicating the distance or displacement from the beginning of the data structure up until a given element or point. In this way, a location of the token is defined.

In addition, for any numerical term x, keep as payload the distance t.d=d(x). Namely, the tuple (doc, offset, t.d) is indexed in the posting-list of stem(t). The distance can then be used in retrieval and scoring of a query.

In other implementations of the inventions instead of keeping t.d with stem(x) in the index, the actual x may be kept with stem(x). This additional approach may have advantages in simplicity at both indexing and search time and is just another way to implement this invention.

Figure 3:
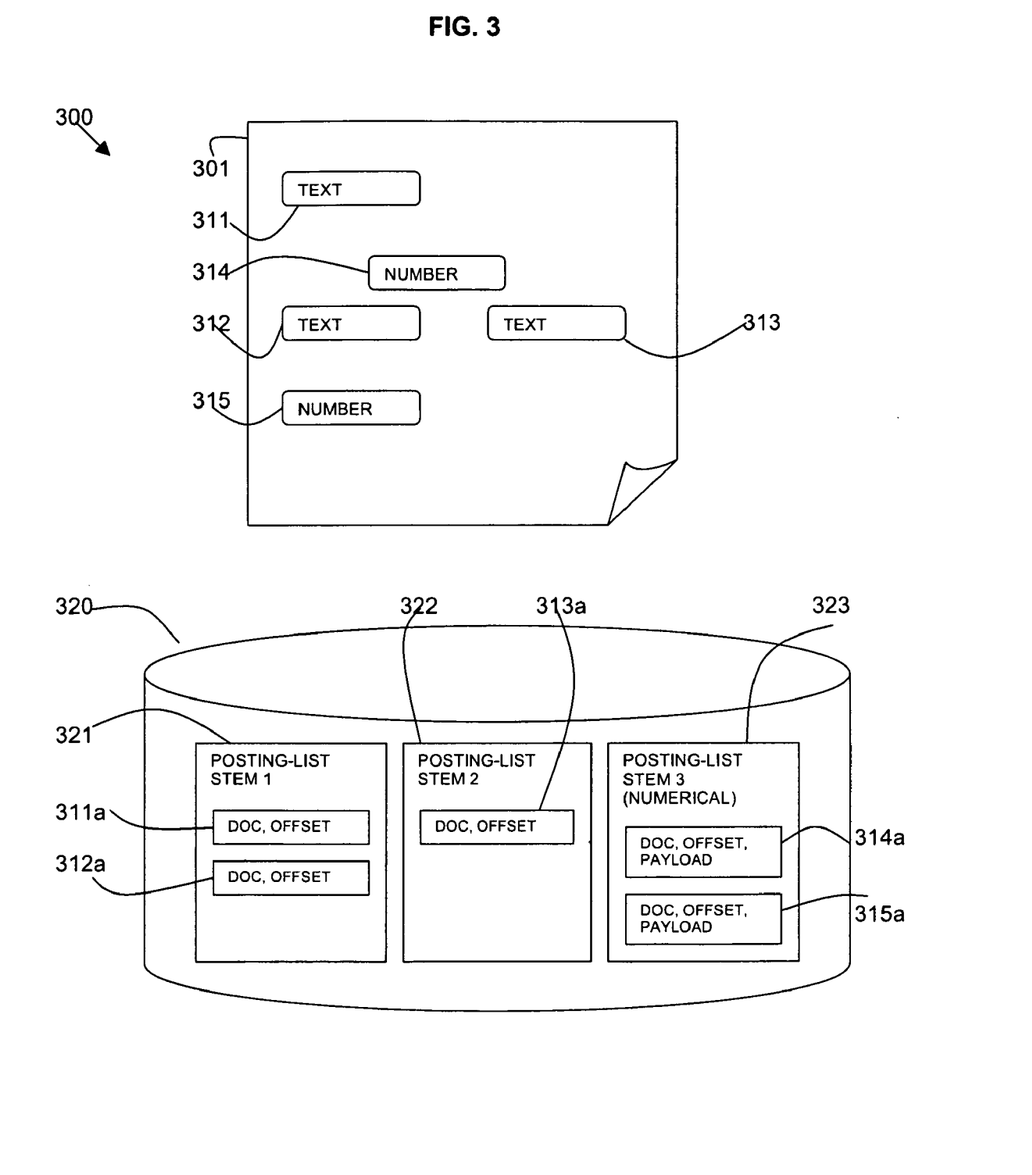
FIG. 3 is a schematic diagram of a indexing a document in accordance with the present invention.

Referring to FIG. 3, a schematic representation 300 of indexing a document 310 using stemming is shown. A document 310 is tokenised to extract all tokens 311-315 in the form of text 311-313 or numeric 314-315 terms. For each token 311-315 an entry 311a-315a is added to a posting-list for a stem 321-323 stored in an index 320.

The entries 311a-315a for all tokens 311-315 whether text 311-313 or numeric 314-315 include the document and offset of the token 311-315 in order to locate the token 311-315. In the case of tokens 314-315 with numeric terms, the entry 314a-315a includes a payload in the form of the distance of the term of the token from the stem.

Figure 4:
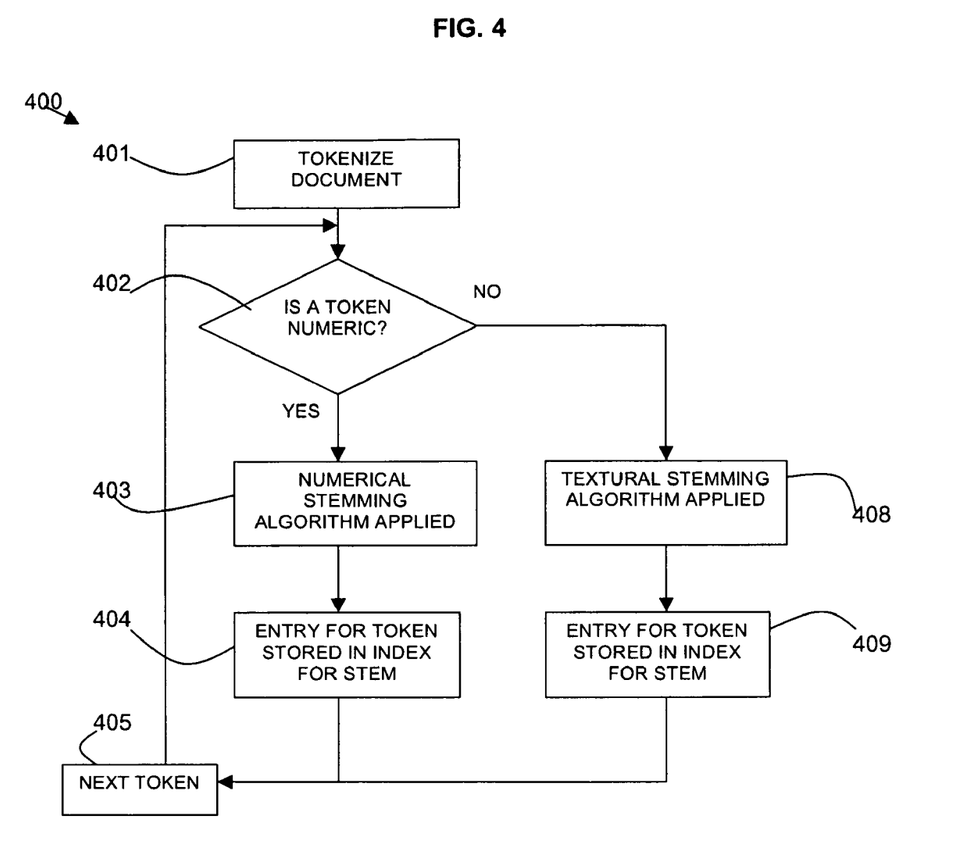
FIG. 4 is a flow diagram of a method of indexing in accordance with the present invention.

Referring to FIG. 4, a flow diagram 400 shows the method of indexing documents using the stemming method.

A document is tokenized 401 and for each token it is determined 402 if the token is numeric This may be by being interpreted as a number by a standard number parser. If the token is numeric, a numerical stemming algorithm is applied 408 and an entry for the token is stored 409 in a posting-list in an index for the stem. The entry for the numerical token includes the document, offset and payload of the token. The method then proceeds to the next token 405.

If the token is determined 402 not to be numeric, a textual stemming algorithm is applied 406 and an entry for the token is stored 407 in a posting-list in an index for the stem. The entry for the textual token includes the document and offset of the token. The method proceeds to the next token 405. In this way, tokens are treated by textual stemmer by default unless they are determined to be numeric.

Scoring

The cosines similarity function of the vector space model is modified for considering numerical terms. A similar modification can be applied to other similarity measurement schemes.

In the Vector-Space Model (VSM), documents and queries are both represented by vectors in the vector space.

The tf-idf weight (term frequency-inverse document frequency) is a weight often used in information retrieval and text mining. This weight is a statistical measure used to evaluate how important a word is to a document in a collection or corpus. The importance increases proportionally to the number of times a word appears in the document but is offset by the frequency of the word in the corpus. Variations of the tf-idf weighting scheme are often used by search engines as a central tool in scoring and ranking a document's relevance given a user query. One of the simplest ranking functions is computed by summing the tf-idf for each query term; many more sophisticated ranking functions are variants of this simple model.

The tf-idf weighting scheme is often used in the vector space model together with cosine similarity to determine the similarity between a document and a query.

The formula gives:

$$\text{score}(q,d) = \Sigma_t \text{idf}(t) * [\text{tf}(t,q) * \text{tf}(t,d)]/(|q|*|d|) \quad \text{Equation (1)}$$

where:
t is a any term in the query/document.
idf(t)=log(n/$n_t$) where n is the number of documents in the collection and $n_t$ is the number of documents containing the term t.
tf(t,v)=the number of occurrences of t in v where v stands for d or q.
Comment: tf(t,v) is usually determined by an increasing monotonic function F of the number of occurrences of t in v. For simplicity and without loss of generality assume that f is the identity function.
|q| and |d| are the vector lengths.

Recall that t is a stem of a textual term.

For extending the VSM to consider numerical terms, the distance between any occurrences of the numerical term t in the query to any occurrence of t in the document is also considered. Therefore, modify Equation (1) by the following formula:

$$\text{score}(q,d) = \Sigma_t \text{idf}(t) * [\Sigma_{\{occ(t,q)\}} \Sigma_{\{occ(t,d)\}} (1 - \text{dist}(t_{iq}, t_{jd})/M)]/(|q|*|d|) \quad \text{Equation (2)}$$

Where:
t is a any (textual or numerical) term in the query/document.
occ(t,q) and occ(t,d) are the sequences of occurrences of t in q and d respectively.
dist($t_{iq}$, $t_{jd}$) is the distance between the original values of occurrence i of t in q and occurrence j of t in d.

For textual terms, define dist($t_{iq}$, $t_{jd}$)=0 for any pair of occurrences. It is easy to see that Equation (2) is reduced to Equation (1) in the case that no numerical terms are involved, and assuming that tf(t,x) is defined as freq(t in x). If tf(t,x) has a more complex definition, e.g. sqrt(freq(t in x)) then a slightly different formula can be used to serve for both textual and numerical terms.

For numerical terms, dist($t_{iq}$, $t_{jd}$) measures the distance between the true numerical values in q, $t_{iq}$.d, and in d, $t_{jd}$.d (recall that t is a numerical stem and its distance from the true value in the given occurrence is kept as the stem's attribute, t.d:

$$\text{dist}(t_{i,q}, t_{j,d}) = |t_{i,q}.d - t_{j,d}.d| \text{ if } |t_{i,q}.d - t_{j,d}.d| < M;$$

$$\text{dist}(t_{i,q}.d - t_{j,d}.d) = M \text{ if } |t_{i,q}.d - t_{j,d}.d| \geq M;$$

EXAMPLE

Consider the following two documents and the given query, and assume M=10:

$$doc1 = \{48, 50, 1998\} \Longrightarrow [40(8), 50(0), 1990(8)]$$

$$doc2 = \{42, 1996, 1999\} \Longrightarrow [40(2), 1990[6], 1990(9)]$$

$$q = \{49\} \Longrightarrow [40(9)]$$

Since only the stem 40 is included in both the query and the documents, and since the documents length is equal then:

$$\text{score}(doc1, q) \sim 1 - |9-8|/10 = 0.9$$

$$\text{score}(doc2, q) \sim 1 - |9-2|/10 = 0.3$$

doc1 is more similar than doc 2 since 48 is closer to 49 then 42.

However, it should be noted that doc1 also contains the term 50 which is also close to the query term. In the current approach, such similar terms are missed that do not share the same stem with the query terms. It is easy to show that given a query numeric term x, only values in the range [stem(x), stem(x)+M] will be considered by the scoring formula. Since 50 is not in the range [40, 50] this term does not contribute to the score of doc1.

As noted earlier, an alternative implementation could store x rather than d(x) together with stem(x) in the index. In such a case the computation of dist($t_{i,q}$, $t_{j,d}$) is simpler, simple $|x-y|$, where x is the exact value of the indexed document term and y is the exact value of the search term.

The retrieval approach can be expanded to also consider such close terms as described further below.

Query Expansion

Given a numerical query term x, the aim is to consider all documents containing value y such that $|x-y|<M$. This can be done by expanding the query with the following terms:

| | | |
|---|---|---|
| t0 = stem(x) | and t0.d = dist(x) | // this is the original stem of x |
| t1 = stem(x)−M | and t1.d = M+dist(x) | //the closer stem on the left |
| t2 = stem(x)+M | and t2.d = −M+dist(x) | //the closer stem on the right. |

Lemma: Given x such that stem(x)=t0. Then, for any y such that $|x-y|<M$, $t1 \leq y < t2+M$ or $t0-M \leq y < t0+2M$
Proof:

$$|y-x|<M \to -M<y-x<M \to x-M<y<x+M. \qquad 1.$$

$$y > x - M \geq t0 - M. \qquad 2.$$

$$y < x + M < t2 + M = t0 + 2M \qquad 3.$$

As a consequence, since y is in the range [t0−M ... t0+2M] it is guaranteed that any document containing value y such that $|y-x|<M$ must be indexed by one of the stemmed terms t0, t1, or t2. As a conclusion, expanding a numerical term by these two extra stems solves the missing close terms problem seen in the example above.

Example (Continue)

$$doc1 = \{48, 50, 1998\} \Longrightarrow [40(8), 50(0), 1990(8)]$$

$$doc2 = \{42, 1996, 1999\} \Longrightarrow [40(2), 1990[6], 1990(9)]$$

$$q = \{49\} \Longrightarrow [40(9), 30(19), 50(-1)]$$

$$\begin{aligned}\text{score}(doc1, q) &= (1 - |9-8|/10) + (1 - |-1-0|/10) \\ &= 0.9 + 0.9 \\ &= 1.8 \\ \text{score}(doc2, q) &= 1 - |9-2|/10 \\ &= 0.3\end{aligned}$$

Now score(doc1) is higher since both tokens, 48, and 50, are found close to the query term, 49.

Similarly, it is easy to show that by expanding the query term x with the terms: {stem(x)−kM, stem(x)−(k−1)M . . . stem(x)+(k−1)M, stem(x)+kM} it is guaranteed to match all docs with a numeric value in the range [stem(x)−kM, . . . , stem(x)+(k+1)M]

In addition, it is possible to expand at indexing time rather than at search time, i.e. to store more multiplications of M with the index, and this way be faster at search time, not needing to expand the query.

Figure 5:
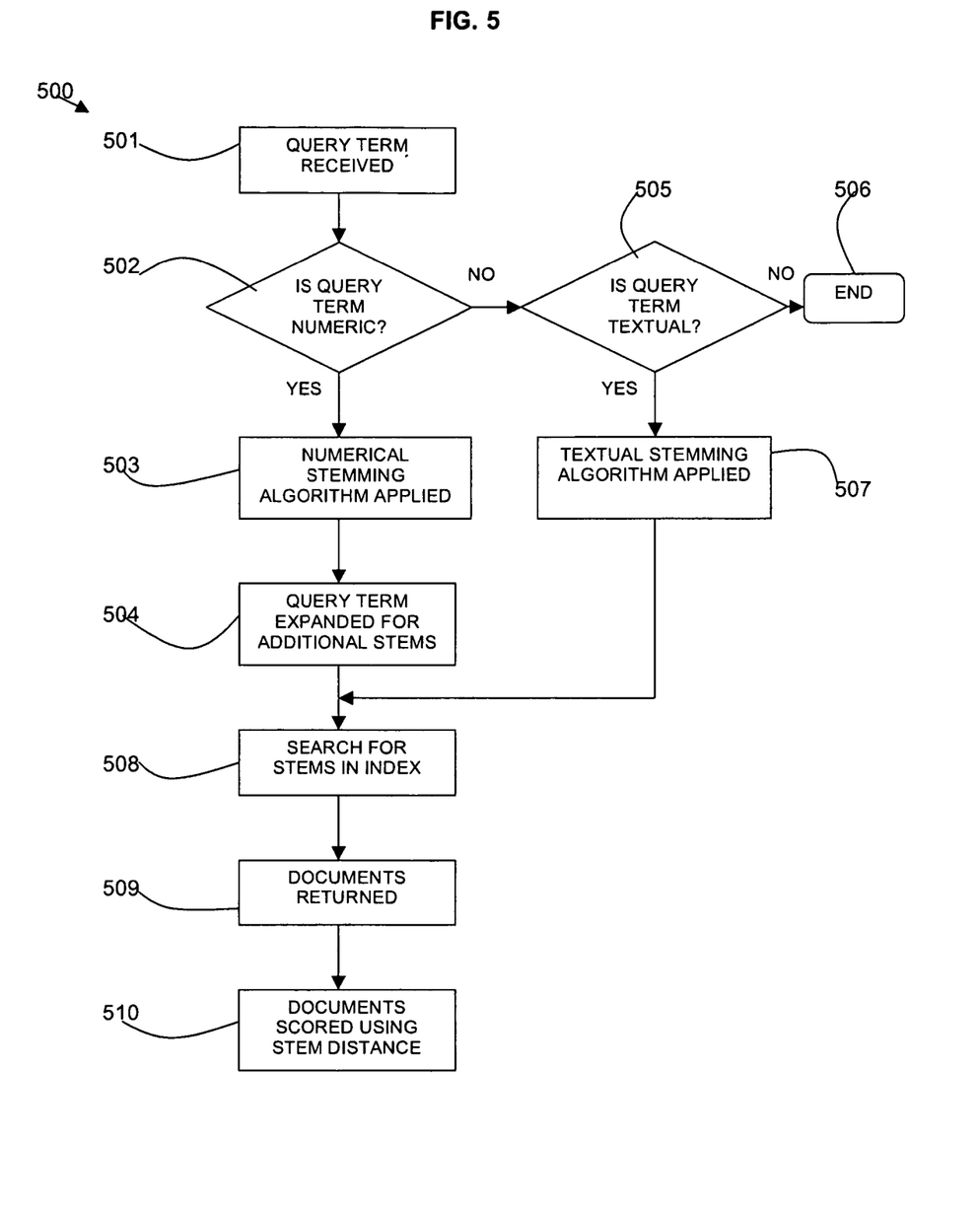
FIG. 5 is a flow diagram of a method of searching in accordance with the present invention.

Referring to FIG. 5, a flow diagram 500 shows a method of searching. A query term is received 501 and is determined 502 if the query term is a numeric term. This may be by being interpreted as a number by a standard number parser. If the query term is numerical, the numerical term is stemmed 503 using the described numerical stemming algorithm. As an optional step, the query term is expanded 504 as described above to include additional stems.

If the query term is determined 502 not to be a numeric term, it is determined if it is a textual term 505. If it is not a textual term, the term is neither numeric nor textual and the method ends 506. If the query term is a textual term, the method applies textual stemming 507.

The stems of the numerical terms and the textual terms are searched 508 in the posting-lists for stems of documents held in an index. Documents are returned 509 having tokens with relevant stems. The index of the stems is used to score 510 the returned documents using Equation (2) given above. This includes the distance measurement of the numeric terms.

Stem Selection—Setting the Modulus Value:

The numerical stemming process depends on the modulus value M. Selecting too large M value might follow with too large posting lists since many numbers will share the same stem. In the extreme case, an M might be selected that is larger then all existing numerical values in the collection, hence all numbers will share the same stem (with a different distance attribute of course). The main effect will be on search time since a very large posting list should be scanned. On the other hand, choosing a small M value will cause many different stems to be created, enlarging the index size while improving query execution time.

If the range of numeric values in the collection is known in advance, M can be set according to trade-off between search time and index size. Moreover, if one knows the real distribution of the numbers in the collection, M can be defined in a way specific to this distribution. For example, knowing that the sole numeric value are years in the twentieth century, one can define the stems to be dense between 1900 and 2000 and very sparse otherwise.

An additional possible approach is to define M as a function itself, for instance M(x)==Max(1, log(x−2 log(x))). This will allow large numbers to be treated differently from small numbers.

For the case in which fielded search is supported and documents contain different fields, each with its own numeric distribution, the M value can be defined according the distribution of values in any of the fields, so every field might have its own proper modulus value.

As indexes are incremental in nature and more data is becoming available with time, M can be adaptive, i.e., as the index grows with more and more values, it might become evident that M should be made larger or smaller. Since the exact value is maintained with the stem (or, in some implementations, easily computed), it is possible to migrate the index to "better" M values without re-indexing the entire collection.

Expansions:

Exact numeric search:

The suggested solution can be easily extended to support exact numeric search. For such a query term q where exact matches are desired, retrieve the documents containing terms t with stem(t)=stem(q) and filter out the documents for each all the occurrence values of stem(t) occur where stem(q).d !=stem(t).d.

Range search:

Similarly, expand the query terms to cover the given range and filter out documents for which their values exceed the desired range.

An indexer or scoring mechanism based on textual and numeric stemming may be provided as a service to a customer over a network.

The invention can take the form of an entirely hardware embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for searching numerical terms, comprising:
processing in a computer-based application a numerical term to a stem, the stem being in the form of a number, and a distance measurement of the numerical term to the stem, wherein a numerical term is a string of characters identified as a number by a numeric parser;
wherein processing a numerical term to a stem includes a numerical stemming algorithm including a modulus set for sensitivity of the stemming, wherein a stem is a multiple of the modulus;
indexing the numerical term in a search index by the stem for search retrieval;
wherein any of said steps are implemented in any of
a) computer hardware and
b) computer software embodied in a non-transitory, computer-readable medium.

2. The method as claimed in claim 1, wherein processing a numerical term to a stem, includes interpreting number formats to approximate to the nearest stem.

3. The method as claimed in claim 1, wherein a document is tokenized to determine textual terms and numerical terms in the document, and wherein textual terms are processed by a textual stemming algorithm and indexed by a stem for search retrieval.

4. The method as claimed in claim 1, wherein indexing of terms by a stem includes a reference to the document and offset in the document of a term.

5. The method as claimed in claim 1, wherein indexing of numerical terms includes the distance measurement to its stem.

6. The method as claimed in claim 1, including:
receiving a query and processing the query to divide it into terms, including numerical terms;
processing a numerical term of the query to a stem, the stem being in the form of a number, and a distance measurement of the numerical term to the stem, wherein a numerical term is a string of characters identified as a number by a numeric parser; and
retrieving document results for the stem from an index.

7. The method as claimed in claim 6, wherein processing a numerical term includes expanding the term to more than one stem.

8. The method as claimed in claim 6, including scoring results by comparing the distance measurements of the query terms and the document results for the stem.

9. The method as claimed in claim 6, including scoring results by the similarity between two pieces of text including keywords and numbers, by expanding a cosine similarity measure by integrating distance measurement between numeric terms.

10. The method as claimed in claim 6, including providing an exact numeric search by filtering out terms with a different distance measurement from the query term.

11. The method as claimed in claim 6, including expanding a query term to cover a given range, and filtering out terms whose distance measurement exceeds the given range.

12. A system for searching numerical terms, comprising:
a computer-based stemming module for processing a numerical term to a stem, the stem being in the form of a number, and a distance measurement of the numerical term to the stem, wherein a numerical term is a string of characters including identified as a number by a numeric parser;
an indexer for indexing the numerical term in a search index by the stem for search retrieval;
a user interface for setting a modulus for sensitivity of the stemming;
wherein the stemming module and the indexer are executed in any of
a) computer hardware having a processor coupled to a memory, wherein said processor is configured to execute said processing and indexing steps and store information related to said processing and indexing steps in said memory, and b) computer software embodied in a non-transitory, computer-readable medium.

13. The system as claimed in claim 12, including a tokenizer for selecting numerical terms includes interpreting number formats.

14. The system as claimed in claim 12, wherein the tokenizer determines textual terms and numerical terms in a document, and wherein textual terms are processed by a textual stemming module.

15. The system as claimed in claim 12, including:

a query processor for processing a query to divide it into terms, including a numerical term and processing a numerical term of the query to a stem, the stem being in the form of a number, and a distance measurement of the numerical term to the stem, wherein a numerical term is a string of characters identified as a number by a numeric parser; and a retriever for retrieving results for the stem from the index.

16. The system as claimed in claim 15, wherein including a query expander for processing a numerical term includes expanding the term to more than one stem.

17. The system as claimed in claim 15, including a scoring mechanism for scoring results by comparing the distance measurements of the query terms and the document results for the stem.

18. The system as claimed in claim 17, wherein the scoring mechanism includes scoring by the similarity between two pieces of text including keywords and numbers, by expanding a cosine similarity measure by integrating distance measurement between numeric terms.

19. The system as claimed in claim 15, including a user input mechanism for requesting an exact numeric search, and an exact number filter for filtering out terms with a different distance measurement from the query term.

20. The system as claimed in claim 15, including a user input mechanism for requesting a number range search, and a number range filter for filtering out terms whose distance measurement exceeds the given range.

* * * * *